May 29, 1956

E. S. JEFFERSON 2,747,811

FISHING REEL

Filed Oct. 1, 1953

INVENTOR.
E. S. Jefferson

BY *Victor J. Evans & Co.*

ATTORNEYS

May 29, 1956 E. S. JEFFERSON 2,747,811
FISHING REEL
Filed Oct. 1, 1953 2 Sheets-Sheet 2

INVENTOR.
E. S. Jefferson
BY Victor J. Evans & Co.
ATTORNEYS

United States Patent Office 2,747,811
Patented May 29, 1956

2,747,811
FISHING REEL

Ernest S. Jefferson, Belhaven, N. C.

Application October 1, 1953, Serial No. 383,477

3 Claims. (Cl. 242—84.1)

This invention relates to fishing tackle, and more particularly to a fishing reel.

The object of the invention is to provide a fishing reel for mounting on a fishing rod whereby the reel can be used as a spinning surf reel, a trolling reel, or a deep sea reel.

Another object of the invention is to provide a fishing reel which is constructed so that the spool rotates and wherein no thumbing is necessary during use of the reel.

A further object of the invention is to provide a fishing reel which is extremely simple and inexpensive to manufacture.

Other objects and advantages will be apparent during the course of the following description.

In the accompanying drawings, forming a part of this application, and in which like numerals are used to designate like parts throughout the same:

Figure 6:
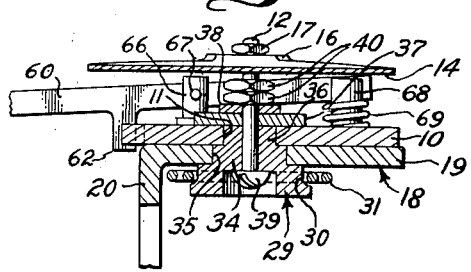
Figure 6 is a sectional view taken on the line 6—6 of Figure 3.

Referring in detail to the drawings, the numeral 10 designates a stationary disk which is provided with a central opening 11, Figure 6. Depending from the disk 10 and formed integral therewith or secured thereto is a pair of spaced parallel posts 12, Figure 2, and a clamp 14 is connected to the posts 12. The clamp 14 is adapted to be connected to a conventional fishing rod 15 in any suitable manner so as to maintain the reel in place on the rod, Figure 1. The clamp 14 is provided with a pair of apertured ears 16, and suitable bolt and nut assemblies 17 serve to connect the ears 16 to the posts 12.

Rotatably connected to the disk 10 is an L-shaped bracket 18, and the bracket 18 includes a base 19 which is arranged contiguous with the upper surface of the disk 10. Arranged at right angles with respect to the base 19 is an arm 20 which is adapted to be connected to the bracket 21 of a fishing reel 22 by bolts or screws 23, Figure 2. The reel 22 includes a rotary spool 24 which may have a line 25 trained thereover, and the line 25 is provided with a loop 26, Figure 1, for a purpose to be later described. A handle member 27 may be provided for rotating the spool 24 in the usual manner, and a conventional resistance member 28 may be provided for varying the resistance on the line.

Figure 1:
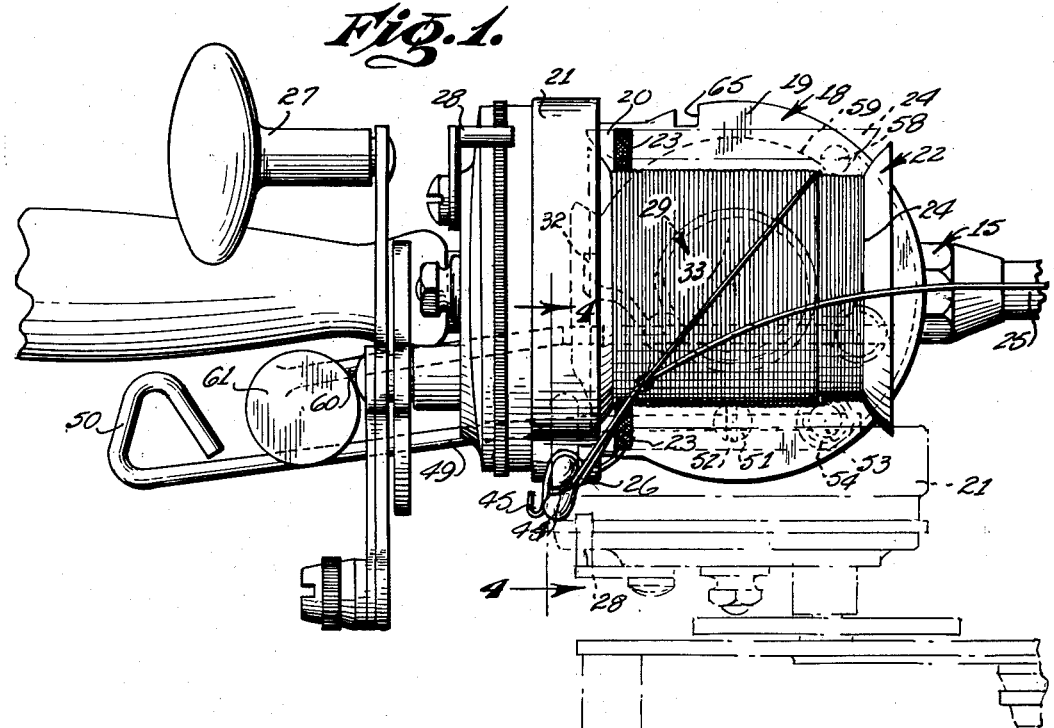
Figure 1 is a top plan view of the fishing reel, constructed according to the present invention.
Figure 2:
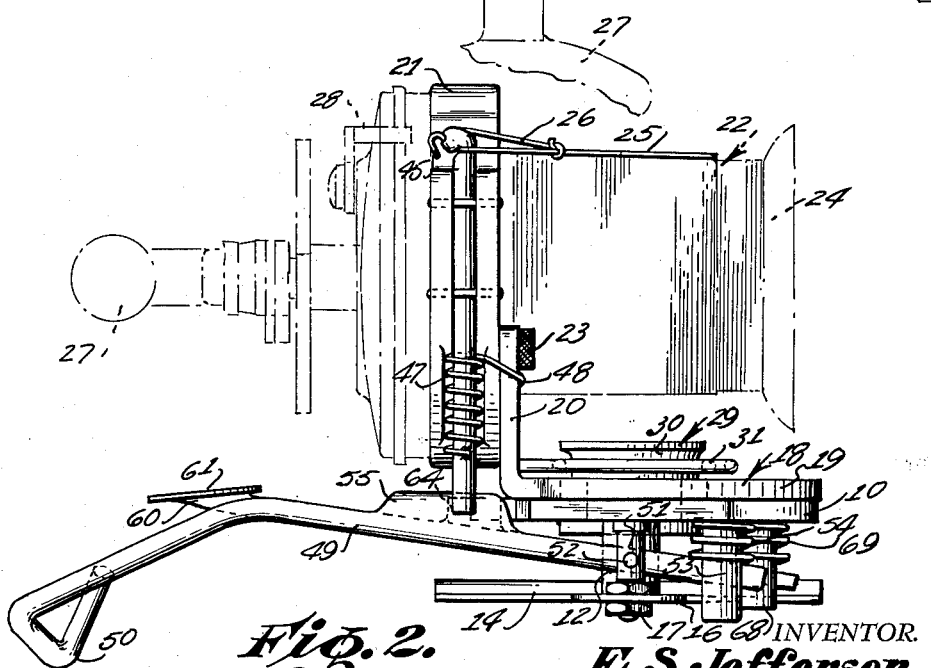
Figure 2 is a side elevational view of the fishing reel.

For rotatably connecting the bracket 18 to the disk 10, a body member 29 is provided, Figure 6. The body member 29 includes an upper collar portion which has an annular groove 30, and arranged in engagement with the groove 30 is a spring member 31. An end 32 of the spring member 31 is arranged in engagement with the arm 20, and the other end 33 of the spring 31, Figure 1, is connected to the body member 29. The body member 29 includes a reduced diameter portion 34 which extends through an opening 35 in the base 19, and a smaller portion 36 which extends through the opening 11 in the disk 10. Washers 37 and 38 are arranged below the disk 10, and a bolt 39 extends through the body member 29, through the washers 37 and 38, and nuts 40 are arranged in threaded engagement with the bolt 39 for maintaining the parts in their proper assembled relation.

The bracket 21 of the reel 22 is provided with a channel 41. Movably mounted in the channel 41 is a hammer 42 which is provided with a transverse finger 43 on its upper end. The finger 43 is provided with an annular groove 44, and the loop 26 of the line 25 is adapted to be selectively arranged in engagement with the groove 44. A wire member 45 is connected to the finger 43 for preventing accidental disengagement of the loop 26 from the groove 44. The lower end of the hammer 42 is provided with a bifurcated portion or cutout 46. A coil spring 47 is circumposed on the hammer 42 adjacent the lower end thereof, and the coil spring 47 includes a transverse portion 48 which is arranged in engagement with the arm 20.

Pivotally connected to the disk 10 is an arm 49 which is provided with a finger engaging portion 50 on one end thereof. The arm 49 is pivotally connected to a bushing 51 which is secured to the lower end of the disk 10, the arm 49 being connected to the bushing 51 by means of a pivot pin 52. The other end of the arm 49 is slidably mounted in a bifurcated bushing 53, and a coil spring 54 is circumposed on the bushing 53 and abuts the arm 49 for normally urging or biasing the arm 49 into the position shown in Figure 2. A projection 55 is secured to the arm 49, and the projection 55 is adapted to be received in the bifurcated lower end 46 of the hammer 42.

Figure 3:
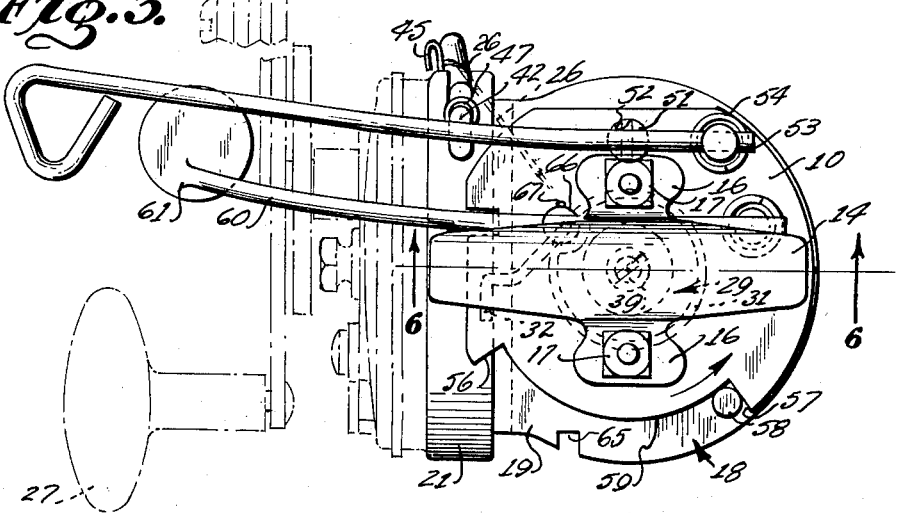
Figure 3 is a bottom plan view of the fishing reel.
Figure 4:
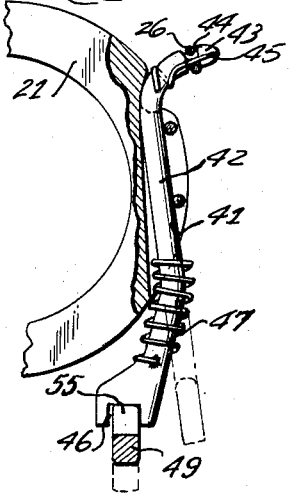
Figure 4 is a sectional view taken approximately on the line 4—4 of Figure 1.
Figure 5:
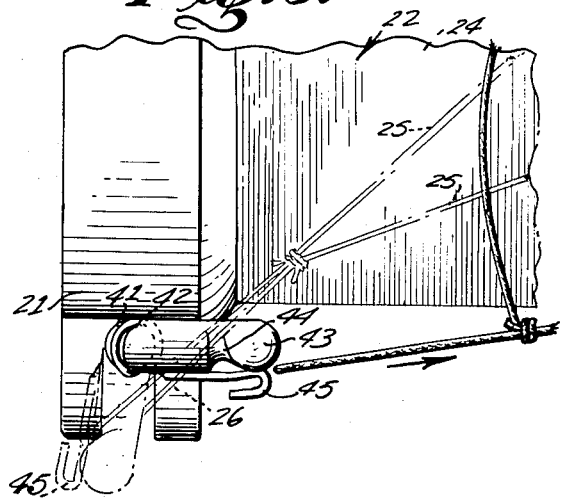
Figure 5 is an enlarged fragmentary elevational view showing certain constructional details of the loop attached to the hammer.

The outer periphery of the disk 10 is provided with a cutout 59, Figure 3, and the cutout 59 defines a pair of shoulders 56 and 57 which are adapted to engage a stop pin 58 that is secured to the base 19 whereby rotary movement of the base 19 will be limited when the shoulders contact the stop pin 58. There is further provided a pivotally mounted lever 60 which has a finger engaging portion 61 on an outer end thereof. A tooth or pawl 62 is carried by the lever 60, and the tooth 62 is mounted for movement through a cutout 63 in the disk 10. The tooth 62 may engage a shoulder 64 on the rear of the bracket 18, or the tooth 62 may be arranged in registry with a slot 65 in the base 19 whereby the bracket 18 will be maintained immobile in its various adjusted positions. The lever 60 is pivotally connected to a bushing 66 by means of a pin 67, Figure 3, and the bushing 66 may be secured to the undersurface of the disk 10. The lever 60 also has an end slidably mounted in a bushing 68, and a coil spring 69 is circumposed on the bushing 68 for maintaining or urging the lever 60 into the position shown in Figure 2.

From the foregoing it is apparent that a spinning reel has been provided which can be used as a spinning surf reel, a trolling reel and a deep sea reel since no certain size or test line or sinker is required. Smaller models may be used as fresh water bait casting reels and the device can also be used on any length rod. Further, no line guide is necessary as in returning the line the reel is used as any ordinary surf reel. The line knot 26 is a simple knot and if the loop or knot 26 breaks there is no loss of fish or bait. Two knots may be tied in the line to assure a better lock in the loop 26. By having the loop 26 tied in the line 25 at the proper distance from the leader that carries the lure, it will be seen that with the loop hooked over the line holding hammer 42 at the groove 44, the loop will leave the hammer in proper relation to the rod tip to make a good cast. When the cast is made the parts are in the position shown in solid lines in Figure 1, and after the cast is made the lever or arm 49 is pressed with the thumb on the portion 50, the casting weight or lure will pull the line off the end of the spool 22. When the cast is complete and all the line 25 is carried off the spool 22 that the cast and weight will remove, then by pressing on the flat portion 61 of the lever 60, the reel will be free to rotate whereby the coil spring 31 will automatically return the reel 90 degrees from the position shown in solid lines in Figure 1 to the position shown in broken lines. Then, by turning the crank or handle 27 the user has a conventional surf reel since the lever 60 locks the reel in the broken line position of Figure 1.

It will be seen that the hammer 42 holds the fishing line 25 when casting due to the provision of the loop 26 engaging the groove 44. Furthermore, no thumbing is necessary. The spring 47 serves to return the hammer to its normal position and by manually depressing the arm 49 the hammer can be released. The lever 60 serves to lock the reel in place.

To operate the spinning surf reel, the reel is arranged at right angles with respect to the rod and the line is arranged on the spool up to the loop 26. Then the loop 26 is hooked on the hammer 42 so that the spring 45 holds the loop on. Then, the lever 61 is pressed and the reel is twisted around 90 degrees until the reel locks in position, Figure 1, so that the spool is parallel to the rod.

To make the cast, the rod is brought back to about 3:00 o'clock and then back to about 9:00 o'clock with the thumb on the lever number 50. Then the lever 50 is pressed which causes the hammer 42 to be released so that the loop and the line are taken off the spool by the weight on the line. When the cast is complete with the same thumb the lever 61 is pressed and the reel returns at right angles to the rod and the line may be retrieved in the usual manner.

For trolling the reel is used at right angles to the rod and the loop 26 is disregarded and also the hammer 42 and members 50 and 61 are disregarded so that the device is used as a conventional trolling reel. When the device is being used for bottom or deep sea fishing it is used in the same manner as for trolling.

I claim:

1. In a fishing reel, a stationary disk, a pair of spaced parallel posts depending from said disk and secured thereto, a clamp arranged below said disk for attachment to a fishing rod, said clamp having a pair of apertured ears for connection to the posts, a body member secured to said disk and including an upper collar provided with an annular groove, an L-shaped bracket rotatably mounted on said body member, said bracket including a base arranged contiguous to said disk and a leg arranged at right angles with respect to said base, a spool connected to said leg, a spring member in said groove and having one end connected to said body member and its other end connected to said leg, the bracket being provided with a channel, a hammer, movably mounted in said channel and having a transverse finger on its upper end provided with a groove, said groove adapted to be selectively engaged by a loop in the fishing line, the lower end of said hammer being bifurcated, a spring pressed arm pivotally connected to said disk and provided with a projection for engagement by the bifurcated end of said hammer, a spring pressed lever pivotally connected to said disk and a pawl carried by said lever for selectively engaging said bracket and base.

2. The apparatus as described in claim 1, wherein said disk is provided with a cutout in its outer periphery defining a pair of shoulders, and a stop secured to said base for engaging said shoulders.

3. The apparatus as described in claim 1, and further including finger engaging portions on said lever and arm.

References Cited in the file of this patent

UNITED STATES PATENTS

| | | |
|---|---|---|
| 2,546,559 | Nix | Mar. 27, 1951 |
| 2,613,046 | Redding | Oct. 7, 1952 |
| 2,614,767 | Dean | Oct. 21, 1952 |